United States Patent [19]
Costello et al.

[11] Patent Number: 5,744,665
[45] Date of Patent: Apr. 28, 1998

[54] MALEIMIDE COPOLYMERS AND METHOD FOR INHIBITING HYDRATE FORMATION

[75] Inventors: Christine Ann Costello, Easton, Pa.; Enock Berluche, Phillipsburg, N.J.; Russell Harlan Oelfke, Houston; Larry Dalton Talley, Friendswood, both of Tex.

[73] Assignee: Exxon Production Research Company, Houston, Tex.

[21] Appl. No.: 659,550

[22] Filed: Jun. 6, 1996

Related U.S. Application Data

[60] Provisional application No. 60/000,071, Jun. 8, 1995.
[51] Int. Cl.$^6$ ..................................................... C07C 9/00
[52] U.S. Cl. ............................ 585/15; 585/950; 95/153
[58] Field of Search .......................... 585/15, 950; 95/153

[56] References Cited

U.S. PATENT DOCUMENTS

| | | | |
|---|---|---|---|
| 3,696,085 | 10/1972 | Lederer et al. | 260/80.3 |
| 4,929,425 | 5/1990 | Hoots, et al. | 422/13 |
| 5,420,370 | 5/1995 | Sloan, Jr. | 585/15 |
| 5,432,292 | 7/1995 | Sloan, Jr. | 585/15 |

FOREIGN PATENT DOCUMENTS

| | | | |
|---|---|---|---|
| PCT/EP93/01519 | 12/1993 | WIPO | E21B 37/06 |
| PCT/US95/06042 | 11/1995 | WIPO | E21B 37/06 |

OTHER PUBLICATIONS

T. V. Sheremeteva, G.N. Larina, V.N. Tsvetkov, and I. N. Shtennikova: "Influence of the Structure of Unsaturated Imides on Their Polymerizability and on the Polymer Properties" *J. Polymer Sci.:Part C*, No. 22, pp. 185–194 (1968) No Month.

Howard C. Haas and Ruby L. MacDonald, "Maleimide Polymers, I.A Polymeric Color Reaction" *Journal of Polymer Science: Polymer Chemistry Edition*, vol. 11 327–343 (1973) No Month.

M. G. Bradbury, S. D. Hamann, and M. Linton, "Solid-phase Polymerizations at High Pressures", *Aust. J. Chem.*, vol. 23, pp. 511–523 (1970) No Month.

Y. Nakayama and G. Smets, "Radical and Anionic Homopolymerization of Maleimide and N–n–Butylmaleimide", *Journal of Polymer Science: Part A–1*, vol. 5, pp. 1619–1633 (1967) No Month.

Hiroshi Aida, Iwao Takase, and Takashi Nozi, "UV–induced polymerization of maleimides in solution", *Makromol. Chem.*vol. 190, pp. 2821–2134 (1989) Apr.

Tokio Hagiwara, Tsutomu Someno, Hiroshi Hamana, and Tadashi Narita, "Anionic Polymerization of N–Substituted Maleimide. II. Polymerization of N–Ethylmaleimide", *Journal of Polymer Science:Part A:Polymer Chemistry*, vol. 26 pp. 1011–1020 (1988) No month.

T. C. Sandreczki and I. M. Brown, "Characterization of the Free–Radical Homopolymerization of N–Methylmaleimide", *Macromolecules*, vol. 23, pp. 1979–1983 (1990).

C. H. Bamford and J. W. Burley, "Ionic end–groups in polymaleimide", *Polymer*, vol. 14, pp. 394–395 (1973) Apr.

D. Fles and R. Vukovic, "High Conversion Copolymerization of α–Methylstyrene with N–Methylmaleimide or N–Phenylmaleimide", *J. Macromol. Sci–Chem.*, A27 (13&14), pp. 1621–1630 (1990) No Month.

R. K. Sadhir and J. D. B. Smith, "Laser–Initiated Copolymerization of N–VinylPyrrolidone with Maleic Anhydride and Maleimide", *Journal fo Polymer Science: Part A: Polymer Chemistry*, vol. 30, pp. 585–595 (1992) No Month.

Tsutomu Kagiya, Masatsugu Izu, Shunzo Kawai, and Kenichi Fukui, "Solid–State Polymerization of Maleimide , by 2,2'–Azobisisobutyronitrile", *Journal of Polymer Science: Part A–1*, vol. 6(6), pp. 1719–1728 (1968) No Month.

*Primary Examiner*—Glenn Caldarola
*Assistant Examiner*—Nadine Preisch
*Attorney, Agent, or Firm*—Kurt D. Van Tassel; Denise Y. Wolfs

[57] ABSTRACT

Novel maleimide copolymers have at least two monomeric units, a maleimide unit and a vinyl unit having a pendant group, the pendant group having two to twenty-one carbon atoms, at least one nitrogen atom and at least one oxygen atom. The copolymer has an average molecular weight between about 1,000 and about 6,000,000. Preferred maleimide copolymers include acrylamide/maleimide copolymers, N-vinyl amide/maleimide copolymers, vinyl lactam/maleimide copolymers, alkenyl cyclic imino ether/ maleimide copolymers, and acryloylamide/maleimide copolymers. The substantially water soluble maleimide copolymers are useful for inhibiting the formation of clathrate hydrates in a fluid having hydrate-forming constituents by reducing the rate of nucleation, growth, and/or agglomeration of gas hydrate crystals in a petroleum fluid stream, thereby inhibiting the formation of a hydrate blockage in the pipe conveying the petroleum fluid stream. The inhibitor can be used conveniently at low concentrations, for example in the range of from about 0.01% to about 5% by weight of the water present in the oil or gas stream, to effectively treat a petroleum fluid having a water phase.

32 Claims, No Drawings

MALEIMIDE COPOLYMERS AND METHOD FOR INHIBITING HYDRATE FORMATION

This application is based on copending U.S. provisional patent application Ser. No. 60/000,071, filed in the name of C. A. Costello et al on Jun. 8, 1995, and is related to copending U.S. provisional patent application Ser. No. 60/000,070, filed in the name of K. S. Colle et al on Jun. 8, 1995.

FIELD OF THE INVENTION

The present invention relates to novel compositions and a method for inhibiting the formation of clathrate hydrates in a fluid. More specifically, the invention relates to maleimide copolymers and a method for inhibiting the formation of gas hydrates in a pipe used to convey oil or gas.

BACKGROUND OF THE INVENTION

Carbon dioxide, hydrogen sulfide, and various hydrocarbons, such as methane, ethane, propane, normal butane and isobutane, are present in natural gas and other petroleum fluids. However, water is typically found mixed in varying amounts with such petroleum fluid constituents. Under conditions of elevated pressure and reduced temperature clathrate hydrates can form when such petroleum fluid constituents or other hydrate formers are mixed with water. Clathrate hydrates are water crystals which form a cage-like structure around guest molecules such as hydrate-forming hydrocarbons or gases. Some hydrate-forming hydrocarbons include, but are not limited to, methane, ethane, propane, isobutane, butane, neopentane, ethylene, propylene, isobutylene, cyclopropane, cyclobutane, cyclopentane, cyclohexane, and benzene. Some hydrate-forming gases include, but are not limited to, oxygen, nitrogen, hydrogen sulfide, carbon dioxide, sulfur dioxide, and chlorine.

Gas hydrate crystals or gas hydrates are a class of clathrate hydrates of particular interest to the petroleum industry because of the pipeline blockages that they can produce during the production and/or transport of the natural gas and other petroleum fluids. For example, at a pressure of about 1 MPa ethane can form gas hydrates at temperatures below 4° C., and at a pressure of 3 MPa ethane can form gas hydrates at temperatures below 14° C. Such temperatures and pressures are not uncommon for many operating environments where natural gas and other petroleum fluids are produced and transported.

As gas hydrates agglomerate they can produce hydrate blockages in the pipe or conduit used to produce and/or transport natural gas or other petroleum fluid. The formation of such hydrate blockages can lead to a shutdown in production and thus substantial financial losses. Furthermore, restarting a shutdown facility, particularly an offshore production or transport facility, can be difficult because significant amounts of time, energy, and materials, as well as various engineering adjustments, are often required to safely remove the hydrate blockage.

A variety of measures have been used by the oil and gas industry to prevent the formation of hydrate blockages in oil or gas streams. Such measures include maintaining the temperature and/or pressure outside hydrate formation conditions and introducing an antifreeze such as methanol, ethanol, propanol, or ethylene glycol. From an engineering standpoint, maintaining temperature and/or pressure outside hydrate formation conditions requires design and equipment modifications, such as insulated or jacketed piping. Such modifications are costly to implement and maintain. The amount of antifreeze required to prevent hydrate blockages is typically between 10% and 30% by weight of the water present in the oil or gas stream. Consequently, several thousand gallons per day of such solvents can be required. Such quantities present handling, storage, recovery, and potential toxicity issues to deal with. Moreover, these solvents are difficult to completely recover from the production or transportation stream.

Consequently, there is a need for a gas hydrate inhibitor that can be conveniently mixed at low concentrations in the produced or transported petroleum fluids. Such an inhibitor should reduce the rate of nucleation, growth, and/or agglomeration of gas hydrate crystals in a petroleum fluid stream and thereby inhibit the formation of a hydrate blockage in the pipe conveying the petroleum fluid stream.

One method of practicing the present invention uses gas hydrate inhibitors which can be used in the concentration range of about 0.01% to about 5% by weight of the water present in the oil or gas stream. As discussed more fully below, the inhibitors of this invention can effectively treat a petroleum fluid having a water phase.

SUMMARY OF THE INVENTION

According to one aspect of the present invention, there is provided a novel composition comprising a copolymer having at least two monomeric units, wherein one of the monomeric units is a maleimide unit and another of the monomeric units is a vinyl unit having a pendant group, the pendant group having two to twenty-one carbon atoms, at least one nitrogen atom and at least one oxygen atom; the copolymer having an average molecular weight between about 1,000 and about 6,000,000.

The term "copolymer" as used herein will be understood to include polymers having two or more different monomeric units.

Preferably, the copolymer is selected from the group consisting of:

a) acrylamide/maleimide copolymers having the following general formula:

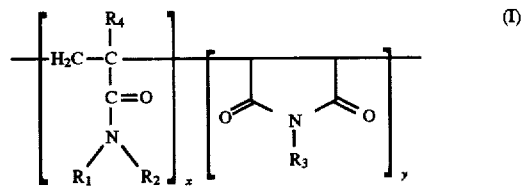

where,

R₁ is hydrogen or a branched, normal or cyclic hydrocarbon group having one to ten carbon atoms, R₂ is a branched, normal or cyclic hydrocarbon group having one to ten carbon atoms, R₃ is hydrogen or a branched, normal or cyclic hydrocarbon group having one to six carbon atoms, R₄ is hydrogen or a methyl group, and x+y is an average number of monomeric units for producing an average molecular weight for the copolymer between about 1,000 and about 6,000,000;

b) N-vinyl amide/maleimide copolymers having the following general formula:

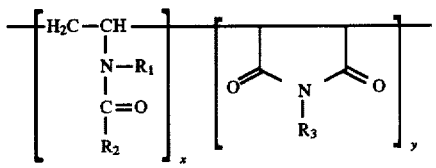

(II)

where,

R₁ is hydrogen or a branched, normal or cyclic hydrocarbon group having one to six carbon atoms, R₂ is a branched, normal or cyclic hydrocarbon group having one to six carbon atoms, wherein R₁ and R₂ have a sum total of carbon atoms greater than or equal to one but less than or equal to eight, R₃ is hydrogen or a branched, normal or cyclic hydrocarbon group having one to six carbon atoms, and x+y is an average number of monomeric units for producing an average molecular weight for the copolymer between about 1,000 and about 6,000,000;

c) vinyl lactam/maleimide copolymers having the following general formula:

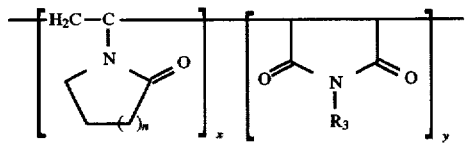

(III)

where, n ranges from one to three,

R₃ is hydrogen or a branched, normal or cyclic hydrocarbon group having one to six carbon atoms, and x+y is an average number of monomeric units for producing an average molecular weight for the copolymer between about 1,000 and about 6,000,000;

d) alkenyl cyclic imino ether/maleimide copolymers having the following general formula:

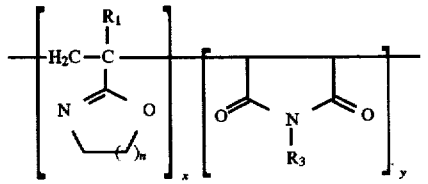

(IV)

where, n ranges from one to four,

R₁ is hydrogen or a methyl group,

R₂ is hydrogen or a branched, normal or cyclic hydrocarbon group having one to six carbon atoms, and x+y is an average number of monomeric units for producing an average molecular weight for the copolymer between about 1,000 and about 6,000,000; and e) acryloylamide/maleimide copolymers having the following general formula:

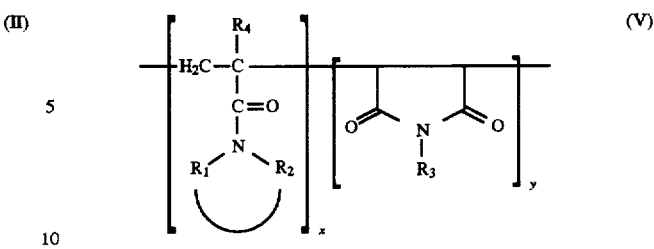

(V)

where R₁ and R₂ are linked to form a nitrogen-containing cyclic structure having from three to ten carbon atoms, R₃ is hydrogen or a branched, normal, or cyclic hydrocarbon group having one to six carbon atoms, R₄ is hydrogen or a methyl group, and x+y is an average number of monomeric units for producing an average molecular weight for the copolymer between about 1,000 and about 6,000,000.

One or both of the R₁ and R₂ groups of the acrylamide/maleimide copolymers and the acryloylamide/maleimide copolymers may have one to four heteroatoms selected from the group consisting of oxygen, nitrogen, sulfur, and combinations thereof.

According to another aspect of the present invention, there is provided a method for inhibiting the formation of clathrate hydrates in a fluid having hydrate-forming constituents. The method comprises treating the fluid with an inhibitor comprising a substantially water soluble maleimide copolymer having at least two monomeric units, wherein one of the monomeric units is a maleimide unit and another of the monomeric units is a vinyl unit having a pendant group, the pendant group having two to twenty-one carbon atoms, at least one nitrogen atom and at least one oxygen atom; the copolymer having an average molecular weight between about 1,000 and about 6,000,000. Preferably, the copolymer is selected from the group consisting of acrylamide/maleimide copolymers, N-vinyl amide/maleimide copolymers, vinyl lactam/maleimide copolymers, alkenyl cyclic imino ether/maleimide copolymers, and acryloylamide/maleimide copolymers, as described above.

DETAILED DESCRIPTION OF THE INVENTION

INVENTIVE METHOD

The inventive method inhibits the formation of clathrate hydrates in a fluid having hydrate-forming constituents. Formation of clathrate hydrates means the nucleation, growth, and/or agglomeration of clathrate hydrates. Such clathrate hydrates may be formed in a fluid whether it is flowing or substantially stationary, but are often most problematic in flowing fluid streams conveyed in a pipe. For example, flow restrictions arising from partial or complete blockages in a fluid stream can arise as clathrate hydrates adhere to and accumulate along the inside wall of the pipe used to convey the fluid. Nonetheless, the invention can be used for inhibiting formation of clathrate hydrates in substantially stationary fluids.

In one embodiment of the invention, a concentrated solution or mixture of one or more of the inhibitors of the type described below is introduced into a petroleum fluid stream having an aqueous phase. As the inhibitor solution or mixture of this invention is substantially dissolved in the aqueous phase or dispersed in the fluid stream it reduces the rate that clathrate hydrates are formed, and thereby reduces the tendency for a flow restriction to occur.

In a preferred embodiment, the solid polymer is first dissolved in an appropriate carrier solvent or liquid to make a concentrated solution or mixture. It should be understood that many liquids may effectively facilitate treatment of the fluid stream without dissolving the inhibitor. For convenience, such liquids are referred to hereafter as solvents whether they produce an inhibitor solution, emulsion, or other type of mixture. The principal purpose of the solvent is to act as a carrier for the inhibitor and to facilitate the absorption of the inhibitor into the aqueous phase of the petroleum fluid. Any solvent suitable for delivering the inhibitor to aqueous phase of the fluid may be used. Such carrier solvents include, but are not limited to, water, brine, sea water, produced water, methanol, ethanol, propanol, isopropanol, glycol, and mixtures of such solvents. Other solvents familiar to those skilled in the art may also be used.

It should be understood that the use of a carrier solvent is not required to practice the invention, but it is a convenient method of introducing the inhibitor into the fluid. In many applications the use of a carrier solvent will facilitate treatment of the fluid stream.

Any convenient concentration of inhibitor in the carrier solvent can be used, so long as it results in the desired final concentration in the aqueous phase of the petroleum fluid. Higher concentrations are preferred, since they result in a reduced volume of concentrated solution to handle and introduce into the petroleum fluid. The actual concentration used in a specific application will vary depending upon the selection of carrier solvent, the chemical composition of the inhibitor, the system temperature, and the solubility of the inhibitor in the carrier solvent at application conditions.

The inhibitor mixture is introduced into the aqueous phase of the petroleum fluid using mechanical equipment, such as, chemical injection pumps, piping tees, injection fittings, and other devices which will be apparent to those skilled in the art. However, such equipment is not essential to practicing the invention. To ensure an efficient and effective treatment of the petroleum fluid with the inhibitor mixture two points should be considered.

First, an aqueous phase is preferably present at the location the inhibitor solution is introduced into the fluid. In some petroleum fluid systems (particularly natural gas systems), an aqueous phase does not appear until the gas has cooled sufficiently for water to condense. If this is the case, the inhibitor solution is preferably introduced after the water has condensed. Alternatively, in the event that an aqueous phase is not available at the point the inhibitor solution is introduced, the inhibitor solution concentration should be selected to ensure that the viscosity of the inhibitor solution is sufficiently low to facilitate its dispersion through the fluid and permit it to reach the aqueous phase.

Second, because the inhibitor primarily serves to inhibit the formation of clathrate hydrates, rather than reverse such formation, it is important to treat the fluid prior to substantial formation of clathrate hydrates. As a wet petroleum fluid cools, it will eventually reach a temperature, known as the hydrate equilibrium dissociation temperature or $T_{eq}$, below which hydrate formation is thermodynamically favored. The $T_{eq}$ of a petroleum fluid shifts as the pressure applied to the fluid and the composition of the fluid change. Various methods of determining a fluid's $T_{eq}$ at various fluid compositions and pressures are well known to those skilled in the art. Preferably, the fluid should be treated with the inhibitor when the fluid is at a temperature greater than $T_{eq}$. It is possible, but not preferable, to introduce the inhibitor while the temperature is at or slightly below the $T_{eq}$ of the fluid, preferably before clathrate hydrates have begun to form.

The quantity of inhibitor introduced into a petroleum fluid with an aqueous phase solvent is typically in the range of from about 0.01 wt % to about 5 wt % of the water present in the fluid. Preferably, the inhibitor concentration is about 0.5 wt %. For example, a laboratory study has shown that adding 0.5 wt % of a copolymer of dimethylacrylamide and propylmaleimide (DMAM/PME) to a petroleum fluid allowed the fluid to cool to a temperature which was about 9.7° C. below its $T_{eq}$ without rapid formation of a hydrate blockage. A higher inhibitor concentration can be used to lower the temperature at which a hydrate blockage is obtained. A suitable concentration for a particular application, however, can be determined by those skilled in the art by taking into account the performance of the inhibitor under such application, the degree of inhibition required for the petroleum fluid, and the cost of the inhibitor.

INHIBITOR DESCRIPTION

Compounds belonging to the group of polymers and copolymers of maleimides, and mixtures thereof, are very effective inhibitors of hydrate nucleation, growth, and/or agglomeration (collectively referred to as hydrate formation). In accordance with the present invention, the copolymer has at least two monomeric units, wherein one of the monomeric units is a maleimide unit and another of the monomeric units is a vinyl unit having a pendant group, the pendant group having two to twenty-one carbon atoms, at least one nitrogen atom and at least one oxygen atom; the copolymer having an average molecular weight between about 1,000 and about 6,000,000. Generic structures of preferred maleimide copolymers are depicted below:

Acrylamide/Maleimide Copolymers

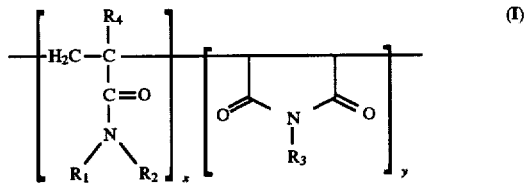

(I)

where, $R_1$ is hydrogen or a branched, normal, or cyclic hydrocarbon group having one to ten carbon atoms, $R_2$ is a branched, normal, or cyclic hydrocarbon group having one to ten carbon atoms, $R_3$ is hydrogen or a branched, normal, or cyclic hydrocarbon group having one to six carbon atoms, $R_4$ is hydrogen or a methyl group, and x+y is an average number of monomeric units for producing an average molecular weight for the copolymer between about 1,000 and about 6,000,000.

One or both of the $R_1$ and $R_2$ groups may have one to four heteroatoms selected from the group consisting of oxygen, nitrogen, sulfur, and combinations thereof.

N-Vinyl Amide/Maleimide Copolymers

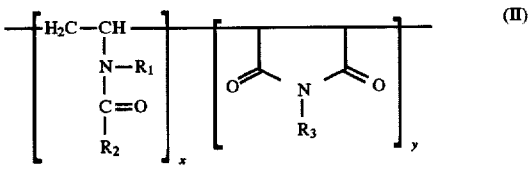

(II)

where, $R_1$ is hydrogen or a branched, normal, or cyclic hydrocarbon group having one to six carbon atoms, $R_2$ is a branched, normal, or cyclic hydrocarbon group having one to six carbon atoms, wherein $R_1$ and $R_2$ have a sum total of carbon atoms greater than or equal to one but less than or equal to eight, $R_3$ is hydrogen or a branched, normal, or cyclic hydrocarbon group having one to six carbon atoms, and x+y is an average number of monomeric units for producing an average molecular weight for the copolymer between about 1,000 and about 6,000,000.

Vinyl Lactam/Maleimide Copolymers

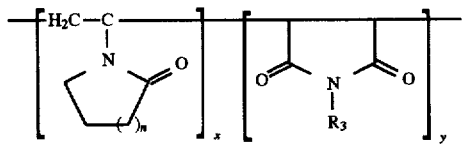 (III)

where, n ranges from one to three, $R_3$ is hydrogen or a branched, normal, or cyclic hydrocarbon group having one to six carbon atoms, and x+y is an average number of monomeric units for producing an average molecular weight for the copolymer between about 1,000 and about 6,000,000.

Alkenyl Cyclic Imino Ether/Maleimide Copolymers

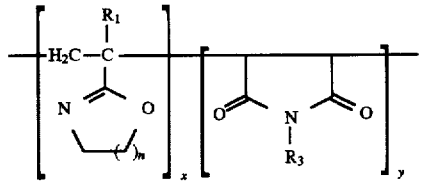 (IV)

where, n ranges from one to four, $R_1$ is hydrogen or a methyl group, $R_2$ is hydrogen or a branched, normal or cyclic hydrocarbon group having one to six carbon atoms, and x+y is an average number of monomeric units for producing an average molecular weight for the copolymer ranging from about 1,000 and about 6,000,000.

Acryloylamide/Maleimide Copolymers

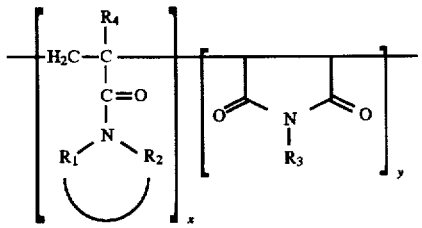 (V)

where $R_1$ and $R_2$ are linked to form a nitrogen-containing cyclic structure having from three to ten carbon atoms, $R_3$ is hydrogen or a branched, normal, or cyclic hydrocarbon group having one to six carbon atoms, $R_4$ is hydrogen or a methyl group, and x+y is an average number of monomeric units for producing an average molecular weight for the copolymer between about 1,000 and about 6,000,000.

One or both of the $R_1$ and $R_2$ groups may have one to four heteroatoms selected from the group consisting of oxygen, nitrogen, sulfur, and combinations thereof.

Maleimide copolymers of interest as gas hydrate inhibitors comprise a maleimide monomer copolymerized with one or more monomers chosen from a class of monomers including, but not limited to, other maleimides, acrylamides, N-vinyl amides, alkenyl cyclic imino ethers and vinyl lactams, such that the resultant copolymer is substantially water soluble. For example, various maleimides can be copolymerized with various acrylamides, such as dimethylacrylamide, to produce an effective inhibitor in the class of copolymers described above.

These maleimide copolymers may be used in mixture with other substantially water soluble polymers including, but not limited to, poly(vinylpyrrolidone) (PVP), poly(vinylcaprolactam) (PVCap), copolymers of vinylpyrrolidone and vinylcaprolactam, poly(N-methyl-N-vinylacetamide), copolymers of N-methyl-N-vinylacetamide and isopropylmethacrylamide, copolymers of N-methyl-N-vinylacetamide and acryloylpiperidine, copolymers of N-methyl-N-vinylacetamide and methacryloylpyrrolidine, and copolymers of N-methyl-N-vinylacetamide and acryloylpyrrolidine.

Without limiting the scope of the invention, and for the purpose of illustrating the invention, various maleimide copolymers were synthesized and tested, including acrylamide/maleimide copolymers where dimethylacrylamide (DMAM) was copolymerized with maleimide (ME), ethylmaleimide (EME), propylmaleimide (PME), and butylmaleimide (BME).

Other maleimide copolymers of interest and synthesized include other acrylamide/maleimide copolymers, such as DMAM/methylmaleimide (DMAM/MME), and DMAM/cyclohexylmaleimide (DMAM/CHME), N-vinyl amide/maleimide copolymers, such as N-methyl-N-vinylacetamide/ethylmaleimide (VIMA/EME), and lactam/maleimide copolymers, such as vinylcaprolactam/ethylmaleimide (VCap/EME).

INHIBITOR SYNTHESIS

General Procedure

Dimethylacrylamide (DMAM) used in the synthesis procedures described below was obtained from Polysciences. Standard laboratory procedures familiar to those skilled in the art were used to synthesize the evaluated polymers identified above. Benzene, tetrahydrofuran (TEF), or other low molecular weight solvents were used as either reaction or purification solvents.

EXAMPLE I

Copolymerization of N,N-Dimethylacrylamide (DMAM) and Maleimide (ME) (70/30 mol charge)

Raw materials: DMAM was purified by passing it through an Aldrich MEHQ Inhibitor Remover Column (Catalogue #30,631-2). ME was purchased from Aldrich and used without any further purification. Water was deionized by passing it through a Millipore® ion filtration unit (Model #ZWDJ02511); it was degassed by rapid boiling while purging with $N_2$, then cooled to room temperature while maintaining the $N_2$ purge. 2,2_-Azobis[2-methylpropionamide] dihydrochloride (V-50, Monomer-Polymer Laboratories) was used as received.

Copolymerization procedure: 11.0 g (0.111 mol) purified DMAM and 4.62 g (0.0476 mol) ME were combined with 141 ml deionized, degassed water in a three-necked reaction kettle equipped with a thermometer, a stirrer, and a $N_2$ inlet/outlet. (The kettle had been previously purged with $N_2$.) The solution was heated to 60° C. Then, 0.1682 g (0.62 mmol) V-50 dissolved in 3 ml water was added to the monomer solution. This reaction mixture was stirred overnight at 60° C. under an $N_2$ blanket. The next day, the reaction mixture was slightly viscous. The polymer was precipitated in acetone, collected by filtration, and dried in a vacuum oven at 60° C. overnight. $^1$H NMR and $^{13}$C NMR spectra were consistent with the formation of a 70/30 DMAM/ME copolymer.

EXAMPLE 2

Copolymerization of DMAM and Methylmaleimide (MME) (50/50 mol charge)

Raw materials: DMAM (purchased from Polysciences) was purified by passing it through an Aldrich MEHQ Inhibitor Remover Column (Catalogue #30,631-2). MME, also from Aldrich, was used as received. Anhydrous benzene (Aldrich) was transferred using a cannula or a syringe under a positive pressure of nitrogen. AIBN (2,2__-azobis[2-isobutylnitrile], Johnson-Matthey) was recrystallized from methanol.

Copolymerization procedure: 8.65 g (0.872 mol) of the de-inhibited DMAM described above was combined with 9.69 g (0.872 mol) methylmaleimide and 200 ml benzene in a three-necked reaction kettle equipped with a thermometer, a stirrer, and a $N_2$ inlet/outlet. (The kettle had been previously purged with $N_2$.) The solution was heated to 60° C. Then, an AIBN solution (0.1444 g (0.88 mmol) in 4 ml benzene) was injected into the monomer solution. The reaction mixture was maintained at 60° C. for 24 hr. The polymer was isolated by pouring the reaction mixture into diethylether and collecting the polymer by filtration. The product was dried in a vacuum oven overnight at 60° C. The polymer was re-purified by dissolution into THF, followed by precipitation into hexane, collection by filtration, and drying under vacuum as described above. The final purified product yield was 16.4 g (89%). The $^1$H and $^{13}$C NMR spectra were consistent with the formation of a 49/51 DMAM/MME copolymer. This copolymer had a cloud point of 39.5° C. at a concentration of 0.5% in brine.

EXAMPLE 13

Copolymerization of DMAM and Ethylmaleimide (EME) (50/50 mol charge)

Raw materials: DMAM was purchased from Polysciences and purified as described below. EME (Aldrich) was used without any further purification. Anhydrous benzene (Aldrich) was transferred using a cannula or a syringe under a positive pressure of nitrogen. AIBN (Johnson-Matthey) was recrystallized from methanol.

DMAM purification: 32.9 g DMAM and 21.5 g benzene were combined and passed through an Aldrich MEHQ Inhibitor Remover Column (Catalogue #30,631-2). A 39.2 g solution was collected.

Copolymerization procedure: 14.9 g of the de-inhibited DMAM benzene solution (9 g active DMAM (0.091 mol)) described above was combined with 11.4 g (0.91 mol) ethylmaleimide and 209 ml additional benzene in a three-necked reaction kettle equipped with a thermometer, a stirrer, and a $N_2$ inlet/outlet. (The kettle had been previously purged with $N_2$.) The solution was heated to 60° C. Then, an AIBN solution (0.1509 g (0.92 mmol) in 4 ml benzene) was injected into the monomer solution. The reaction mixture was maintained at 60° C. for 24 hr. The polymer was isolated by pouring the reaction mixture into hexane and collecting the polymer by filtration. The product was dried in a vacuum oven overnight at 60° C. The polymer was re-purified by dissolution into THF, followed by precipitation into diethyl ether, collection by filtration, and drying under vacuum as described above. The final purified product yield was 15.3 g (75%). The $^1$H and $^{13}$C NMR spectra were consistent with the formation of a 51.6/48.4 DMAM/EME copolymer.

EXAMPLE 4

Copolymerization of DMAM and EME (79/21 mol charge)

The same procedure was followed as in Example 3, except that the monomer ratio charged was adjusted to 79/21 DMAM/EME and the AIBN used as the initiator was changed to 0.1451 g (0.88 mmol). 17 g of purified polymer was collected, representing a 87% yield. The $^1$H and $^{13}$C NMR spectra were consistent with the formation of a 82.6/17.4 DMAM/EME copolymer.

EXAMPLE 5

Copolymerization of DMAM and Propylmaleimide (PME) (70/30 mol charge)

Raw materials: DMAM was purified as described below. PME was purchased from Fluka and used as received. Anhydrous benzene (Aldrich) was transferred using a cannula or a syringe under a positive pressure of nitrogen. AIBN (Johnson-Matthey) was recrystallized from methanol.

DMAM purification: 32.9 g DMAM and 21.5 g benzene were combined and passed through an Aldrich MEHQ Inhibitor Remover Column (Catalogue #30,631-2). A 39.2 g solution was collected.

Copolymerization procedure: 18.7 g of the de-inhibited DMAM/benzene solution (11.4 g active DMAM (0.1151 mol)) described above was combined with 6.86 g (0.049 mol) ethylmaleimide and 188 ml additional benzene in a three-necked reaction kettle equipped with a thermometer, a stirrer, and a $N_2$ inlet/outlet. (The kettle had been previously purged with $N_2$.) The solution was heated to 60° C. Then, an AIBN solution (0.1357 g (0.83 mmol) in 4 ml benzene) was injected into the monomer solution. The reaction mixture was maintained at 60° C. for 24 hr. The polymer was isolated by pouring the reaction mixture into hexane and collecting the polymer by filtration. The product was dried in a vacuum oven overnight at 60° C. The polymer was re-purified by dissolution into THF, followed by precipitation into diethyl ether, collection by filtration, and drying under vacuum as described above. The final purified product yield was 15.8 g (87%). The $^1$H and $^{13}$C NMR spectra were consistent with the formation of a 74/26 DMAM/PME copolymer.

EXAMPLE 6

Copolymerization of DMAM and Butylmaleimide (BME) (70/30 mol charge)

Raw materials: DMAM was purified as described below. BME (Fluka) was used as received. Anhydrous benzene (Aldrich) was transferred using a cannula or a syringe under a positive pressure of nitrogen. AIBN (Johnson-Matthey) was recrystallized from methanol.

DMAM purification: 32.9 g DMAM and 21.5 g benzene were combined and passed through an Aldrich MEHQ Inhibitor Remover Column (Catalogue #30,631-2). A 39.2 g solution was collected.

Copolymerization procedure: 18.7 g of the de-inhibited DMAM/benzene solution (11.4 g active DMAM (0.1151 mol)) described above was combined with 7.55 g (0.049 mol) butylmaleimide and 195 ml additional benzene in a three-necked reaction kettle equipped with a thermometer, a stirrer, and a $N_2$ inlet/outlet. (The kettle had been previously purged with $N_2$.) The solution was heated to 60° C. Then, an AIBN solution (0.1408 g (0.86 mmol) in 4 ml benzene) was injected into the monomer solution. The reaction mixture was maintained at 60° C. for 24 hr. The polymer was isolated by pouring the reaction mixture into hexane and collecting the polymer by filtration. The product was dried in a vacuum oven overnight at 60° C. The polymer was re-purified by dissolution into THF, followed by precipitation into diethyl ether, collection by filtration, and drying under vacuum as described above. The final purified product yield was 14.6 g (77%). The $^1H$ and $^{13}C$ NMR spectra were consistent with the formation of a 72.4/27.6 DMAM/BME copolymer.

EXAMPLE 7

Copolymerization of DMAM and BME (90/10 mol charge)

The same procedure was followed as in Example 6, except that the monomer ratio charged was adjusted to 90/10 DMAM/BME and the AIBN used as the initiator was changed to 0.1133 g (0.69 mmol). 14 g of purified polymer was collected, representing a 92% yield. The $^1H$ and $^{13}C$ NMR spectra were consistent with the formation of a 91.9/8.1 DMAM/BME copolymer.

EXAMPLE 8

Copolymerization of DMAM and Cyclohexylmaleimide (CHME) (90/10 mol charge)

Raw materials: DMAM (purchased from Polysciences) was purified by passing it through an Aldrich MEHQ Inhibitor Remover Column (Catalogue #30,631-2). CHME (purchased from Aldrich) was used as received. Anhydrous benzene (Aldrich) was transferred using a cannula or a syringe under a positive pressure of nitrogen. AIBN (Johnson-Matthey) was recrystallized from methanol.

Copolymerization procedure: 12.45 g (0.131 mol) of the de-inhibited DMAM described above was combined with 2.5 g (0.014 mol) CHME and 154 ml benzene in a three-necked reaction kettle equipped with a thermometer, a stirrer, and a $N_2$ inlet/outlet. (The kettle had been previously purged with $N_2$.) The solution was heated to 60° C. Then, an AIBN solution (0.1112 g (0.68 mmol) in 4 ml benzene) was injected into the monomer solution. The reaction mixture was maintained at 60° C. for 24 hr. The polymer was isolated by pouring the reaction mixture into diethylether and collecting the polymer by filtration. The product was dried in a vacuum oven overnight at 60° C. The final purified product yield was 14 g (93%). The $^1H$ and $^{13}C$ NMR spectra were consistent with the formation of a 89/11 DMAM/MME copolymer.

EXAMPLE 9

Copolymerization of N-methyl-N-vinylacetamide (VIMA) and EME

Raw materials: VIMA monomer (Aldrich) was purified by distillation. EME monomer was used as received from Aldrich. Anhydrous benzene (Aldrich) was transferred under an inert atmosphere.

Copolymerization procedure: 11.4 g (0.115 mol) VIMA monomer and 3.6 g (0.029 moles) EME monomer were dissolved in 154 ml benzene, loaded into a three-necked reaction kettle equipped with a condensor, a thermometer, and a $N_2$ inlet/outlet, and purged with $N_2$ for one hour. The solution was then heated to 60° C. The reaction mixture was maintained at 60° C. overnight, which resulted in a slightly viscous solution. The next day, the polymer was precipitated into hexane, dissolved into acetone, then reprecipitated into hexane. The reaction product was then dried at 40° C. and $10^{-3}$ torr overnight. The reaction product was characterized by $^1H$ and $^{13}C$ and gel permeation chromatography. The VIMA/EME ratio produced in the copolymer was about 62/38.

EXAMPLE 10

Copolymerization of VIMA, DMAM and EME

Raw materials: VIMA (Aldrich) was purified by passing it through an Aldrich MEHQ Inhibitor Remover Column (Catalogue #30,631-2). DMAM (Polysciences) was purified in a similar manner. EME (Aldrich) was used without further purification. HPLC grade t-butanol (packaged under nitrogen) was purchased from Aldrich and used without further purification. 2,2_-Azobis[2-methylbutylnitrile] (V-67) (Dupont) was used without further purification.

Copolymerization procedure: 0.7 g ($7.67 \times 10^{-3}$ mol) VIMA, 0.76 g ($7.67 \times 10^{-3}$ mol) DMAM and 0.48 g ($3.84 \times 10^{-3}$ mol) EME were loaded into a Schlenk tube equipped with a magnetic stirring bar. 8 ml t-Butanol was added to the monomer solution and the mixture was purged with $N_2$ for 1 hour. The solution was then heated to 80° C. with stirring. Once the temperature was reached, an initiator solution of an $N_2$-purged solution of 20 mg V-67 in 1 ml t-butanol was injected into the monomer solution. The reaction proceeded under $N_2$ at 80° C. overnight. The next day, the reaction mixture was precipitated into diethylether. The reaction product was collected by vacuum filtration and dried at 50° C. and $10^{-3}$ torr overnight. The $^1H$ and $^{13}C$ NMR spectra were consistent with the formation of a 30/54/16 (mol %) VIMA/DMAM/EME terpolymer.

Copolymerization of Various Maleimides with Vinyl Lactams and Other Acrylamides and N-Vinyl Amides It will be apparent to those skilled in the art of polymer synthesis that various maleimides can produce copolymers with vinyl lactams, such as N-vinylpyrrolidone (VP) and N-vinylcaprolactam, various other acrylamides, such as acryloylpyrrolidine (APYD), N,N-diethylacrylamide (DEAM), N-ethylacrylamide (EAM), and N-isopropylacrylamide (iPAM), other N-vinyl amides, such as N-vinyl-N-n-propylpropionamide (VPP), and alkenyl cyclic imino ethers, such as 2-iso-propenyl-2-oxalizone, using procedures substantially similar to those described above.

INHIBITOR EVALUATION

Mini-Loop Testing Procedure

One method for evaluating the effectiveness of an inhibitor uses a bench-scale high pressure apparatus referred to as a mini-loop apparatus. A mini-loop apparatus consists of a loop of stainless steel tubing with about a one-half inch inside diameter and about ten feet in length. The loop also has a transparent section for observing the fluid flow in the loop and the onset of hydrate formation in the loop. Fluid comprising about 40% by volume SSW (Synthetic Sea Water) solution having about 3.5% total ionized salts, 40% by volume hydrocarbon condensate (i.e., $C_6+$), and 20% by volume hydrocarbon gas mixture is circulated around the loop at constant pressure. The hydrocarbon gas mixture is comprised of about 76 mole % methane, 9 mole % ethane, 7 mole % propane, 5 mole % n-butane, 2 mole % iso-butane, and 1 mole % of $C_5+$. The inhibitor is typically injected into the loop as an aqueous solution to produce the desired weight percent concentration of inhibitor in the aqueous sea salt/gas solution. Generally, many hydrate inhibitors are evaluated at about 0.5 wt. % of the aqueous sea salt/gas solution.

The fluid is circulated at a constant velocity of about 2.5 feet/second. The loop and its pump lay in a controlled temperature water bath for controlling the temperature of the fluid circulating in the loop. Water is circulated to ensure uniform temperature throughout the bath and rapid heat transfer between the bath water and the loop. As the loop temperature changes or as hydrates form, the gas volume in the loop will change accordingly. Therefore, to maintain constant pressure in the loop, a pressure compensating device is required. Such a device can be comprised of a gas cell and a hydraulic oil cell separated by a floating piston. So as the gas volume in the loop changes, oil may be added or removed from the oil cell to produce a commensurate addition or removal of gas to the loop. Mini-loop tests are typically run at a pressure of about 1,000 pounds per square inch gauge (p.s.i.g.). However, any pressure between 0 and 3,000 p.s.i.g. could be selected for evaluating the performance of an inhibitor.

The temperature of the water bath is reduced at a constant rate, preferably about 6° F. or 3.3° C. per hour, from an initial temperature of about 70° F. or 21° C. At some temperature, clathrate hydrates begin to rapidly form. As the dissolved gas is used to form clathrate hydrates there is an abrupt and corresponding decrease in the volume of dissolved gas in the aqueous sea salt/gas solution. The temperature at which this abrupt decrease in the volume of dissolved gas is observed is known as the temperature of onset for hydrate formation ($T_{os}$). Recalling from the discussion above, the hydrate equilibrium dissociation temperature or $T_{eq}$ is the temperature below which hydrate formation is thermodynamically favored in an aqueous sea salt/gas solution without an inhibitor present. Therefore, another measure of an inhibitor's effectiveness is the difference between $T_{eq}$ and $T_{os}$, which is known as the inhibitor's subcooling temperature, $T_{sub}$. Therefore, for a given pressure, the greater the subcooling temperature the more effective the inhibitor. Typically, an aqueous sea salt/gas solution with no inhibitor present produces a $T_{sub}$ of about 6°–7° F. or 3.3°–3.9° C.

Mini-Loop Test Results

Without limiting the scope of the invention, and for the purpose of illustrating the invention, various maleimide copolymers were evaluated using the mini-loop testing procedure described above. The results of these evaluations, where available, are presented below:

TABLE I

MINI-LOOP TEST RESULTS WITH POLYMERIC INHIBITORS

| INHIBITOR | Ratio within Polymer | CONC. Wt % | MINI-LOOP SUB-COOLING TEMP (°F.) | MINI-LOOP SUB-COOLING TEMP (°C.) |
| --- | --- | --- | --- | --- |
| None | NA | NA | 7.0 | 3.9 |
| PDMAM* | NA | 0.5 | 11.4 | 6.3 |
| PVIMA* | NA | 0.5 | 12.5 | 6.9 |
| DMAM/ME | 70:30 | 0.5 | 16.2 | 9.0 |
| DMAM/EME | 52:48 | 0.5 | 17.2 | 9.6 |
| DMAM/PME | 74:26 | 0.5 | 17.5 | 9.7 |
| DMAM/BME | 74:28 | 0.5 | 16.8 | 9.3 |
| VIMA/EME | 62:38 | 0.5 | 20.0 | 11.1 |
| VIMA/DMAM/EME | 30:54:16 | 0.5 | 18.0 | 10.0 |

*Values for maleimide homopolymers where $R_3$ is not hydrogen are not given due to insolubility in water.

Generally, copolymerizing DMAM with various maleimides, such as ME, EME, PME, and BME, enhanced inhibitor activity relative to the inhibitor activity for PDMAM and PVIMA. Other maleimides, such as BME and CHME, may similarly enhance inhibitor activity when copolymerized with DMAM or VIMA. Also, other maleimide copolymers formed with vinyl lactams, such as N-vinylpyrrolidone (VP), N-vinylcaprolactam (VCap), and other N-vinyl amides, such as N-vinyl-N-n-propylpropionamide (VPP), acrylamides, such as N,N-diethylacrylamide (DEAM), acryloylpyrrolidine (APYD), and alkenyl cyclic imino ethers, such as 2-iso-propenyl-2-oxazoline (iPpenOx) may enhance inhibitor activity.

The means and method of the invention and the best mode contemplated for practicing the invention have been described. It is to be understood that the foregoing is illustrative only and that other means and techniques can be employed without departing from the true scope of the invention as claimed herein.

We claim:

1. A method for inhibiting the formation of clathrate hydrates in a fluid having hydrate-forming constituents, comprising treating the fluid with an inhibitor comprising a substantially water soluble copolymer having at least two monomeric units, wherein one of the monomeric units is a maleimide unit and another of the monomeric units is a vinyl unit having a pendant group, the pendant group having two to twenty-one carbon atoms, at least one nitrogen atom and at least one oxygen atom; the copolymer having an average molecular weight between about 1,000 and about 6,000,000.

2. A method according to claim 1, wherein the copolymer has the following general formula:

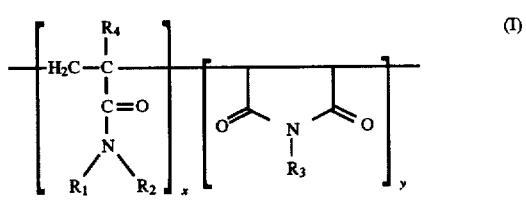

(I)

where,

R is hydrogen or a branched, normal, or cyclic hydrocarbon group having one to ten carbon atoms, $R_2$ is a branched, normal, or cyclic hydrocarbon group having one to ten carbon atoms, $R_3$ is hydrogen or a branched, normal, or cyclic hydrocarbon group having one to six carbon atoms, $R_4$ is hydrogen or a methyl group, and x+y is an average number of monomeric units for producing an average molecular weight for the copolymer between about 1,000 and about 6,000,000.

3. A method according to claim 2, wherein at least one of the $R_1$ and $R_2$ groups have one to four heteroatoms selected from the group consisting of oxygen, nitrogen, sulfur and combinations thereof.

4. A method according to claim 1, wherein the copolymer has the following general formula:

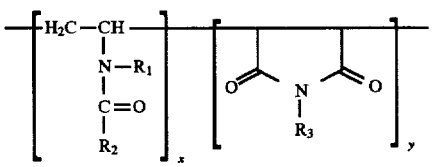
(II)

where, $R_1$ is hydrogen or a branched, normal, or cyclic hydrocarbon group having one to six carbon atoms, $R_2$ is a branched, normal, or cyclic hydrocarbon group having one to six carbon atoms, wherein $R_1$ and $R_2$ have a sum total of carbon atoms greater than or equal to one but less than or equal to eight, $R_3$ is hydrogen or a branched, normal, or cyclic hydrocarbon group having one to six carbon atoms, and x+y is an average number of monomeric units for producing an average molecular weight for the copolymer between about 1,000 and about 6,000,000.

5. A method according to claim 1, wherein the copolymer has the following general formula:

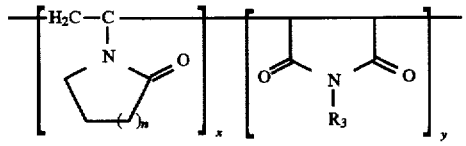
(III)

where, n ranges from one to three, $R_3$ is hydrogen or a branched, normal, or cyclic hydrocarbon group having one to six carbon atoms, and x+y is an average number of monomeric units for producing an average molecular weight for the copolymer between about 1,000 and about 6,000,000.

6. A method according to claim 1, wherein the copolymer has the following general formula:

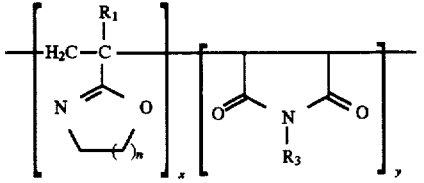
(IV)

where, n ranges from one to four, $R_1$ is hydrogen or a methyl group, $R_2$ is hydrogen or a branched, normal or cyclic hydrocarbon group having one to six carbon atoms, and x+y is an average number of monomeric units for producing an average molecular weight for the copolymer between about 1,000 and about 6,000,000.

7. A method according to claim 1, wherein the copolymer has the following general formula:

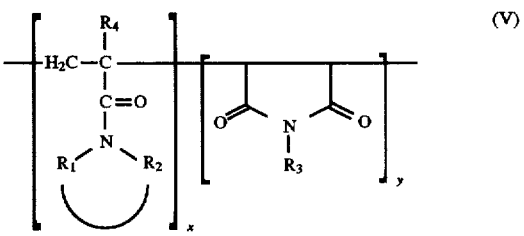
(V)

where $R_1$ and $R_2$ are linked to form a nitrogen-containing cyclic structure having from three to ten carbon atoms, $R_3$ is hydrogen or a branched, normal, or cyclic hydrocarbon group having one to six carbon atoms, $R_4$ is hydrogen or a methyl group, and x+y is an average number of monomeric units for producing an average molecular weight for the copolymer between about 1,000 and about 6,000,000.

8. A method according to claim 7, wherein at least one of the $R_1$ and $R_2$ groups have one to four heteroatoms selected from the group consisting of oxygen, nitrogen, sulfur and combinations thereof.

9. A method according to claim 1, wherein the vinyl unit is N,N-dimethylacrylamide and the maleimide unit is selected from the group consisting of maleimide, methylmaleimide, ethylmaleimide, propylmaleimide, butylmaleimide and cyclohexylmaleimide.

10. A method according to claim 11, wherein the vinyl unit is N-methyl-N-vinylacetamide and the maleimide unit is selected from the group consisting of maleimide, methylmaleimide, ethylmaleimide, propylmaleimide, butylmaleimide and cyclohexylmaleimide.

11. A method according to claim 1, wherein the maleimide unit is ethylmaleimide, a first vinyl unit is N-methyl-N-vinylacetamide and a second vinyl unit is N,N-dimethylacrylamide.

12. A method according to claim 1, wherein the vinyl unit is selected from the group consisting of N-methyl-N-vinylacetamide, N-vinylpyrrolidone, N-vinylcaprolactam, acryloylpyrrolidone, N,N-diethylacrylamide, N-ethylacrylamide, N-isopropylacrylamide, N-isopropylmethacrylamide, N-vinyl-N-n-propylpropionamide and 2-iso-propenyl-2-oxazoline.

13. A method according to claim 1, wherein the inhibitor further comprises a solvent.

14. A method according to claim 13, wherein the solvent is selected from the group consisting of water, brine, sea water, produced water, methanol, ethanol, propanol, isopropanol, glycol and mixtures thereof.

15. A method according to claim 1, wherein the inhibitor further comprises an additive selected from the group consisting of poly(vinylpyrrolidone), poly(vinylcaprolactam), copolymers of vinylpyrrolidone and vinylcaprolactam, poly (N-methyl-N-vinylacetamide), copolymers of N-methyl-N-vinylacetamide and isopropylmethacrylamide, copolymers of N-methyl-N-vinylacetamide and acryloylpiperidine, copolymers of N-methyl-N-vinylacetamide and methacryloylpyrrolidine, and copolymers of N-methyl-N-vinylacetamide and acryloylpyrrolidine.

16. A method according to claim 1, wherein the inhibitor is added in a concentration in the range of from about 0.01 wt % to about 5 wt % of water present in the fluid.

17. A method according to claim 1, wherein the inhibitor is added in a concentration of about 0.5 wt % of water present in the fluid.

18. A method of inhibiting the formation of gas hydrates in petroleum fluids under conditions that would allow formation of gas hydrates in the petroleum fluids, wherein the method comprises:

introducing and dispersing into the petroleum fluids a sufficient amount of an inhibitor to inhibit the formation of gas hydrates; and conveying the petroleum fluids;

wherein the inhibitor comprises a copolymer having at least two monomeric units, wherein one of the monomeric units is a maleimide unit and another of the monomeric units is a vinyl unit having a pendant group, the pendant group having two to twenty-one carbon atoms, at least one nitrogen atom and at least one oxygen atom; the copolymer having an average molecular weight between about 1,000 and about 6,000,000.

19. The method of claim 18 wherein the inhibitor is a copolymer having the following general formula:

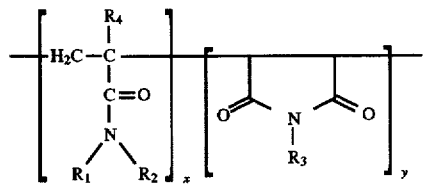

where, $R_1$ is hydrogen or a branched, normal, or cyclic hydrocarbon group having one to ten carbon atoms, $R_2$ is a branched, normal, or cyclic hydrocarbon group having one to ten carbon atoms, $R_3$ is hydrogen or a branched, normal, or cyclic hydrocarbon group having one to six carbon atoms, $R_4$ is hydrogen or a methyl group, and $x+y$ is an average number of monomeric units for producing an average molecular weight for the copolymer between about 1,000 and about 6,000,000.

20. The method of claim 19 wherein the petroleum fluids are conveyed through a pipe and the inhibitor is introduced into the petroleum fluids as an aqueous solution, such that the copolymer is present in an aqueous phase in the petroleum fluids at a concentration in a range of from about 0.01 wt % to about 5 wt %.

21. The method of claim 18 wherein the inhibitor is a copolymer having the following general formula:

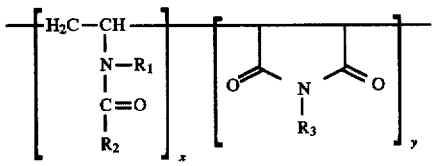

where, $R_1$ is hydrogen or a branched, normal, or cyclic hydrocarbon group having one to six carbon atoms, $R_2$ is a branched, normal, or cyclic hydrocarbon group having one to six carbon atoms, wherein $R_1$ and $R_2$ have a sum total of carbon atoms greater than or equal to one but less than or equal to eight, $R_3$ is hydrogen or a branched, normal, or cyclic hydrocarbon group having one to six carbon atoms, and $x+y$ is an average number of monomeric units for producing an average molecular weight for the copolymer between about 1,000 and about 6,000,000.

22. The method of claim 21 wherein the petroleum fluids are conveyed through a pipe and the inhibitor is introduced into the petroleum fluids as an aqueous solution, such that the copolymer is present in an aqueous phase in the petroleum fluids at a concentration in a range of from about 0.01 wt % to about 5 wt %.

23. The method of claim 18 wherein the inhibitor is a copolymer having the following general formula:

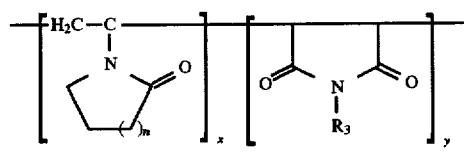

where, n ranges from one to three, $R_3$ is hydrogen or a branched, normal, or cyclic hydrocarbon group having one to six carbon atoms, and $x+y$ is an average number of monomeric units for producing an average molecular weight for the copolymer between about 1,000 and about 6,000,000.

24. The method of claim 23, wherein the petroleum fluids are conveyed through a pipe and the inhibitor is introduced into the petroleum fluids as an aqueous solution, such that the copolymer is present in an aqueous phase in the petroleum fluids at a concentration in a range of from about 0.01 wt % to about 5 wt %.

25. The method of claim 18 wherein the inhibitor is a copolymer having the following general formula:

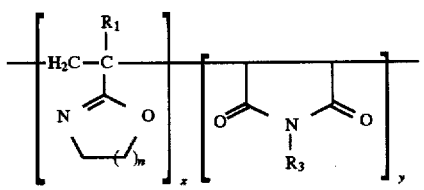

where, n ranges from one to four, $R_1$ is hydrogen or a methyl group, $R_2$ is hydrogen or a branched, normal or cyclic hydrocarbon group having one to six carbon atoms, and $x+y$ is an average number of monomeric units for producing an average molecular weight for the copolymer between about 1,000 and about 6,000,000.

26. The method of claim 25 wherein the petroleum fluids are conveyed through a pipe and the inhibitor is introduced into the petroleum fluids as an aqueous solution, such that the copolymer is present in an aqueous phase in the petroleum fluids at a concentration in a range of from about 0.01 wt % to about 5 wt %.

27. The method of claim 18 wherein the inhibitor is a copolymer having the following general formula:

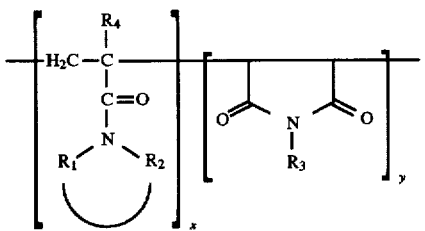

where $R_1$ and $R_2$ are linked to form a nitrogen-containing cyclic structure having from three to ten carbon atoms,
$R_3$ is hydrogen or a branched, normal, or cyclic hydrocarbon group having one to six carbon atoms,
$R_4$ is hydrogen or a methyl group, and
x+y is an average number of monomeric units for producing an average molecular weight for the copolymer between about 1,000 and about 6,000,000.

28. The method of claim 27 wherein the petroleum fluids are conveyed through a pipe and the inhibitor is introduced into the petroleum fluids as an aqueous solution, such that the copolymer is present in an aqueous phase in the petroleum fluids at a concentration in a range of from about 0.01 wt % to about 5 wt %.

29. The method of claim 20 wherein in the inhibitor, the vinyl unit is N,N-dimethylacrylamide and the maleimide unit is selected from the group consisting of maleimide, methylmaleimide, ethylmaleimide, propylmaleimide, butylmaleimide and cyclohexylmaleimide.

30. The method of claim 20 wherein the vinyl unit of the inhibitor is selected from the group consisting of N,N-diethylacrylamide, N-ethylacrylamide, N-isopropylacrylamide, and N-isopropylmethacrylamide and the maleimide unit is selected from the group consisting of maleimide, methylmaleimide, ethylmaleimide, propylmaleimide, butylmaleimide, and cyclohexylmaleimide.

31. The method of claim 22 wherein in the inhibitor, the vinyl unit is N-methyl-N-vinylacetamide and the maleimide unit is selected from the group consisting of maleimide, methylmaleimide, ethylmaleimide, propylmaleimide, butylmaleimide and cyclohexylmaleimide.

32. The method of claim 22 wherein the vinyl unit of the inhibitor is N-vinyl-N-n-propylpropionamide and the maleimide unit is selected from the group consisting of maleimide, methylmaleimide, ethylmaleimide, propylmaleimide, butylmaleimide, and cyclohexymaleimide.

* * * * *